Patented Apr. 6, 1937

2,076,111

UNITED STATES PATENT OFFICE 2,076,111

ESTERIFICATION PROCESS

William J. Bannister, Terre Haute, Ind., assignor to Commercial Solvents Corporation, Terre Haute, Ind., a corporation of Maryland No Drawing. Application August 17, 1934, Serial No. 740,295

14 Claims. (Cl. 260—103)

My invention relates to an improved process for the production of esters of lower aliphatic alcohols. More specifically, my invention relates to an improved process for the production of high boiling esters of the lower alcohols, such as ethyl and propyl esters having boiling points substantially above the boiling points of the corresponding alcohols.

In the past, considerable difficulty has been encountered in the production of high-boiling esters of alcohols which do not form two-phase azeotropic systems with water. In the case of such esters the removal of water during the esterification reaction may not be effected by the usual distillation methods and it has therefore been found to be impossible to secure satisfactory conversions in a reasonably short period of time. For example in the production of diethyl phthalate by reacting phthalic anhydride with an excess of ethyl alcohol and distilling off an alcohol-water mixture, a conversion of only 88% is obtained after 16 hours of distillation during which further alcohol is added to the mixture. It is apparent that this conversion of less than 90% after a reaction period of 16 hours is extremely impractical from a commercial standpoint. Certain modifications of this simplified procedure, such as the use of a third liquid giving rise to a ternary azeotropic mixture, have also been attempted but with no improved results.

I have now discovered that highly satisfactory conversions may be obtained in short periods of time if, instead of carrying out the esterification by refluxing at the boiling point of the alcohol, the reaction mixture is heated to a temperature substantially above this point, and the alcohol is continuously introduced together with a volatile liquid which forms a ternary azeotropic mixture with the alcohol and water. According to this procedure a high reaction temperature may be employed and the water of reaction may be removed substantially as quickly as formed. The advantages of my process may be seen from the fact that a conversion of above 99% may be obtained in 4½ hours in the case of the production of diethyl phthalate.

My process is applicable, generally, to the production of carboxylic acid esters of aliphatic alcohols having less than four carbon atoms, the said esters having boiling points substantially above the boiling points of the corresponding alcohols. The process is particularly applicable to ethyl and propyl esters having boiling points above 200° C. It will be apparent that in the case of esters boiling above 200° C. the azeotropic mixture may be removed by simple distillation, whereas in the case of esters boiling closer to the boiling point of the corresponding alcohol fractionation may be required.

The esters of this type may be prepared either in the presence or the absence of an esterification catalyst, but generally I prefer to utilize a catalyst such as sulphuric acid. It will be apparent that any of the known non-volatile esterification catalysts such as phosphoric acid, sodium acid sulphate, and the like may be successfully employed in my process. I prefer to utilize a concentration of catalyst equivalent to approximately 1% by weight of sulphuric acid based on the weight of the carboxylic acid used, but the amount to be employed may vary somewhat, depending upon the particular ester to be produced. In general, the catalyst concentrations employed in other esterification procedures will be suitable for use in my process.

The acids employed for the production of esters of the type described above may be monocarboxylic acids or polycarboxylic acids of either the aliphatic or aromatic series. In the case of polycarboxylic acids it may be found that partial esterification can readily be effected by simple heating of the alcohol and acid to produce the monoalkyl ester. In such case the mono ester, which is essentially an organic acid, may be employed in my process in the same manner as any monocarboxylic acid. For example, in the case of the production of diethyl phthalate, the monoethyl phthalate may advantageously be produced by preliminary heating of phthalic anhydride and ethyl alcohol, after which the mono ester is completely esterified by the application of my procedure. It is therefore to be understood where the term carboxylic acid is utilized in the present specification and claims it is intended to include partially esterified polycarboxylic acids as well as free acids.

The volatile liquid which is utilized to produce the ternary azeotropic mixture may be any of the liquids known to be suitable for use in azeotropic alcohol distillations. It will be apparent, however, that such liquid must be chemically inactive toward the reactants, including the catalyst, and toward the formed ester. The volatile liquid is advantageously introduced in conjunction with the esterifying alcohol in the form of a mixture which may suitably constitute the binary azeotropic mixture of these two materials. The proportions of the mixture, however, are not at all critical and may vary over quite a wide range. It is only necessary that the alcohol be introduced at a rate exceeding that of the esterification reaction and that sufficient volatile liquid be introduced to form a ternary mixture with the alcohol and all of the water present, thus removing the water as rapidly as it is formed. A particularly advantageous procedure results from the use of a volatile liquid which gives rise to a two phase ternary mixture, the use of benzol in the diethyl phthalate esterification being an example of this type. In such a case the ternary mixture is condensed after removal from the esterification mixture and after separating into two layers, the upper layer containing essentially benzol and alcohol is returned to the reaction vessel. Although this procedure is particularly advantageous, any suitable mixture of the alcohol and volatile liquid may be employed, as described above, and for most purposes a mixture having a ratio of alcohol to volatile liquid ranging from 1:2 to 1:4 will be found to be satisfactory.

The temperature at which the reaction is carried out may be any temperature substantially above the boiling point of the esterfying alcohol and substantially below the boiling point of the formed ester or the decomposition point of any of the materials present. A temperature below the boiling point of the esterifying alcohol will secure no advantage over the prior practice of refluxing the alcohol and acid, and a temperature corresponding to the boiling point of the ester or higher than this point will complicate the procedure due to the addition of a fourth component to the mixture distilling over. In general, I have found that a temperature range of 100° C. to 140° C. is satisfactory for my process, and I prefer to operate in most cases at a temperature of 120-130° C. This temperature range is particularly suited for the production of esters having boiling points above 200° C.

My invention may perhaps best be illustrated by the following specific examples:

Example I

One equivalent of phthalic anhydride and 2.5 equivalents of ethyl alcohol were refluxed for two hours in the presence of approximately 1% by weight of sulphuric acid (sp. gr. 1.84), based on the weight of the phthalic anhydride, after which the excess alcohol was removed by distillation. The resulting monoethyl phthalate, which still contained the esterification catalyst, was then maintained at a temperature of 100° C. while a mixture of 67% benzol—33% ethyl alcohol was continuously added below the surface of the liquid. The resulting alcohol-benzol-water ternary mixture which distilled off was condensed in the usual manner. The benzol-alcohol mixture was added at the rate of 3.5 equivalents of ethyl alcohol over a period of 160 minutes. At the end of this time a conversion to diethyl phthalate was found to be 81.7%. The addition of the benzol-alcohol mixture was then continued for a period of 240 minutes during which time 3.5 equivalents of ethyl alcohol were again introduced. At the end of this period the conversion was found to be 99.3%. The product was then freed from excess alcohol and benzol in the known manner, after which traces of color were removed by the usual decolorizing procedure. The resulting ester was a water-white practically odorless material.

Example II

One equivalent of phthalic anhydride and approximately two equivalents of ethyl alcohol were refluxed for two hours with 1% by weight of sulphuric acid (sp. gr. 1.84), based on the weight of the phthalic anhydride, after which the excess alcohol was removed by distillation to a liquid temperature of 120° C. The resulting monoethyl phthalate was maintained at this temperature for 150 minutes during which time 1.7 equivalents of ethyl alcohol were introduced in the form of a mixture of 67% benzol—33% alcohol. The conversion at the end of this period was found to be 93.6%. The introduction of the benzol—alcohol mixture was continued for 120 minutes during which time a further 1.7 equivalent amount of alcohol was introduced. At the end of this period the conversion was found to be 99.1%.

It may be seen from this example that in less than 4½ hours a conversion of 99% was secured as opposed to a considerably lower value obtained after 16 hours of reaction according to the prior art processes. In both of the above examples the esterification reaction was carried out at a temperature more than 20° C. above the boiling point of the esterifying alcohol, thus clearly increasing the speed of the reaction. It is therefore apparent that my procedure constitutes a marked improvement and presents a method for the production of esters of this type which is commercially feasible and economically desirable.

Although my invention has been specifically illustrated by the above examples, it is to be definitely understood that it is not limited to the particular materials or procedures disclosed. The general applicability of my process to the production of esters of this type will readily be seen by those skilled in the art. As examples of esters which may be produced by my process, there may be mentioned iso-propyl phthalate, ethyl stearate, normal propyl benzoate, ethyl citrate, iso-propyl caprate, normal propyl malonate, ethyl succinate, normal propyl cinnamate, isopropyl tartrate, ethyl salicylate, isopropyl malate, and ethyl fumarate. In general, it may be said that my process is applicable to the production of carboxylic acid esters having a boiling point substantially above that of the corresponding alcohol.

Various volatile liquids which are known to be suitable for azeotropic alcohol distillations may, of course, be regarded as equivalents of benzol in my process, such liquid being chosen with regard to the particular esterification to be carried out. For example, materials such as cyclohexane, cyclohexadiene and cyclohexene which give rise to ternary azeotropic mixtures of low or intermediate boiling points may suitably be employed for the production of esters such as ethyl phthalate, ethyl malate, isopropyl caprate, and the like, and substances such as heptane, methyl cyclohexane, toluene, and the like, which give rise to higher boiling ternary mixtures, may advantageously be employed for the production of higher boiling esters such as normal propyl phthalate, normal propyl tartrate, and the like. In general, it may be said that any volatile liquid which forms a ternary boiling mixture with water and the esterifying alcohol and which is chemically inert toward the reactants and the formed ester will be suitable for use in my process.

It will likewise be apparent to those skilled in the art that various modifications of procedure may be employed without departing from the scope of my invention. For example, instead of introducing the liquid alcohol mixture below the surface of the reactant mixture the alcohol mixture could be vaporized in a separate vessel, suitably in the form of the binary azeotropic mixture, and the vapors introduced into the reactant mass in a like manner. It will also be apparent that equivalent procedures may be employed for securing the contact of the acid and alcohol at a temperature substantially above the boiling point of the alcohol. For example, the acid together with an excess of alcohol and the volatile liquid could be distilled under pressure, thus maintaining a suitably high temperature and removing the water of reaction in the form of an azeotropic mixture. In general, it may be said that the use of any equivalents or modifications of procedure which would naturally occur to one skilled in the art may be employed without departing from the scope of my invention.

My invention now having been described, what I claim is:

1. In a process for the production of carboxylic acid esters of aliphatic alcohols having less than four carbon atoms, the step which comprises introducing into the acid to be esterified a mixture of the alcohol to be esterified and a volatile liquid which forms a ternary boiling mixture with water and said alcohol, and which is chemically inert toward the said reactants and the formed ester, while maintaining the temperature at a point at least 20° C. above the boiling point of the esterifying alcohol and substantially below the boiling point of the formed ester.

2. In a process for the production of carboxylic acid esters of aliphatic alcohols having less than four carbon atoms, the step which comprises introducing into the acid to be esterified a mixture of the alcohol to be esterified and a non-volatile esterification catalyst and a volatile liquid which forms a ternary boiling mixture with water and said alcohol, and which is chemically inert toward the said reactants and the formed ester, while maintaining the temperature at a point at least 20° C. above the boiling point of the esterifying alcohol and substantially below the boiling point of the formed esters.

3. In a process for the production of ethyl esters of carboxylic acids, the steps which comprise introducing into the acid to be esterified a mixture of ethyl alcohol and a volatile liquid which forms a ternary boiling mixture with water and said alcohol and which is chemically inert toward the said reactants and the formed ester, while maintaining the temperature at a point at least 20° C. above the boiling point of the esterifying alcohol and substantially below the boiling point of the formed ester, and removing the resulting vapors of the ternary boiling mixture.

4. In a process for the production of propyl esters of carboxylic acids, the steps which comprise introducing into the acid to be esterified, a mixture of the esterifying alcohol and a volatile liquid which forms a ternary boiling mixture with water and said alcohol and which is chemically inert toward the said reactants and the formed ester, while maintaining the temperature at a point at least 20° C. above the boiling point of the esterifying alcohol and substantially below the boiling point of the formed ester, and removing the resulting vapors of the ternary boiling mixture.

5. In a process for the production of an ethyl ester of a carboxylic acid, the said ester having a boiling point above 200° C., the steps which comprise introducing into the acid to be esterified a mixture of ethyl alcohol and a volatile liquid which forms a ternary boiling mixture with water in said alcohol and which is chemically inert toward the said reactants and the formed ester, while maintaining the temperature within the range 100–140° C., and removing the resulting vapors of the ternary boiling mixture.

6. In a process for the production of a propyl ester of a carboxylic acid, the said ester having a boiling point above 200° C., the steps which comprise introducing into the acid to be esterified, a mixture of the esterifying alcohol and a volatile liquid which forms a ternary boiling mixture with water in said alcohol and which is chemically inert toward the said reactants and the formed ester, while maintaining the temperature within the range 100–140° C., and removing the resulting vapors of the ternary boiling mixture.

7. In a process for the production of diethyl phthalate by the esterification of an acidic phthalic acid compound chosen from the group consisting of phthalic anhydride and monoethyl phthalate, the steps which comprise introducing into said acidic phthalic acid compound a mixture of ethyl alcohol and a volatile liquid which forms a ternary boiling mixture with water in said alcohol and which is chemically inert toward the said reactants and the formed ester while maintaining the temperature within the range 120–130° C., and removing the resulting vapors of the ternary boiling mixture.

8. In a process for the production of diethyl phthalate by the esterification of an acidic phthalic acid compound chosen from the group consisting of phthalic anhydride and monoethyl phthalate, the steps which comprise introducing into said acidic phthalic acid compound, in the presence of a non-volatile esterification catalyst, a mixture of ethyl alcohol and a volatile liquid which forms a ternary boiling mixture with water in said alcohol and which is chemically inert toward the said reactants and the formed ester while maintaining the temperature within the range 120–130° C., and removing the resulting vapors of the ternary boiling mixture.

9. In a process for the production of diethyl phthalate by the esterification of an acidic phthalic acid compound chosen from the group consisting of phthalic anhydride and monoethyl phthalate, the steps which comprise introducing into said acidic phthalic acid compound a mixture of ethyl alcohol and benzol while maintaining the temperature within the range 120–130° C., and removing the resulting vapors of the ternary boiling mixture.

10. In a process for the production of diethyl phthalate by the esterification of an acidic phthalic acid compound chosen from the group consisting of phthalic anhydride and monoethyl phthalate, the steps which comprise introducing into said acidic phthalic acid compound, in the presence of a non-volatile esterification catalyst, a mixture of ethyl alcohol and benzol while maintaining the temperature within the range 120–130° C., and removing the resulting vapors of the ternary boiling mixture.

11. In a process for the production of triethyl citrate by the esterification of an acidic citric acid compound chosen from the group consisting of citric acid, monoethyl citrate and diethyl citrate, the steps which comprise introducing into said acidic citric acid compound a mixture of ethyl alcohol and a volatile liquid which forms a ternary boiling mixture with water and said alcohol and which is chemically inert toward the said reactants and the formed ester, while maintaining the temperature within the range 100–140° C., and removing the resulting vapors of the ternary boiling mixture.

12. In a process for the production of triethyl citrate, the steps which comprise introducing into citric acid a mixture of ethyl alcohol and a volatile liquid which forms a ternary boiling mixture with water and said alcohol and which is chemically inert toward the said reactants and the formed ester, while maintaining the temperature within the range 100–140° C., and removing the resulting vapors of the ternary boiling mixture.

13. In a process for the production of carboxylic acid esters of aliphatic alcohols having less than four carbon atoms, the steps which comprise maintaining the acid to be esterified at a temperature at least 20° C. above the boiling point of the esterifying alcohol and substantially below the boiling point of the formed ester, introducing into said acid a mixture of the esterifying alcohol and a volatile liquid which forms a ternary boiling mixture with water and said alcohol and which is chemically inert toward the said reactants and the formed ester, and removing the vapors of the ternary mixture thus formed.

14. In a process for the production of carboxylic acid esters of aliphatic alcohols having less than four carbon atoms, the steps which comprise maintaining the acid to be esterified, together with a non-volatile esterification catalyst, at a temperature at least 20° C. above the boiling point of the esterifying alcohol and substantially below the boiling point of the formed ester, introducing into said acid a mixture of the esterifying alcohol and a volatile liquid which forms a ternary boiling mixture with water and said alcohol and which is chemically inert toward the said reactants and the formed ester, and removing the vapors of the ternary mixture thus formed.

WILLIAM J. BANNISTER.